United States Patent [19]

Allebone

[11] Patent Number: 4,737,335

[45] Date of Patent: Apr. 12, 1988

[54] METHOD OF VEHICLE WINDOW INSTALLATION

[75] Inventor: Edward T. Allebone, Sterling Heights, Mich.

[73] Assignee: General Motors Corporation, Detroit, Mich.

[21] Appl. No.: 895,236

[22] Filed: Aug. 11, 1986

[51] Int. Cl.⁴ ............................................. B29C 45/14
[52] U.S. Cl. ..................................... 264/511; 264/36; 264/263
[58] Field of Search ................. 264/510, 511, 102, 36, 264/571, 263, 252; 156/104

[56] References Cited

U.S. PATENT DOCUMENTS

| | | |
|---|---|---|
| 750,660 | 1/1904 | Langford . |
| 2,766,484 | 10/1956 | Sanderson . |
| 3,037,810 | 6/1962 | Kelley ................................ 264/263 |
| 3,263,014 | 7/1966 | Deisenroth . |
| 3,920,787 | 11/1975 | McDowell et al. ................. 264/263 |
| 4,561,625 | 12/1985 | Weaver ................................ 249/85 |

Primary Examiner—James Lowe
Attorney, Agent, or Firm—Patrick M. Griffin

[57] ABSTRACT

A method for adhesively attaching a window assembly in which the adhesive may be applied after, rather than before, the window assembly is pushed into place, so as to avoid smear problems.

2 Claims, 2 Drawing Sheets

METHOD OF VEHICLE WINDOW INSTALLATION

This invention relates to vehicle windows in general and specifically to a method for adhesively installing a vehicle window assembly and a structure for a vehicle window assembly suited to that method of installation.

BACKGROUND OF THE INVENTION

There is a continuing trend to install vehicle windows adhesively, with a single bead of adhesive applied to a gasket of the window serving both to attach the window into the window opening of a vehicle as well as serving as a seal. Urethane adhesive is the adhesive of choice for such installations because it is strong and it is flowable, conforming well to those surfaces that it contacts, and providing a good seal when cured. The conventional method for such an adhesive installation is to apply an adhesive bead into a groove or channel in the under surface of the window gasket, and to then push the window in place into the window opening and against a frame that defines the window opening. The frame generally provided by a pinch weld formed from the metal panels of the vehicle body. A drawback of the conventional method is that the exposed bead of urethane adhesive, being flowable, is also easily smeared off on those parts of the vehicle body that it is pushed past as the window is pushed into place. Such smearing is especially likely if the size or location of the bead has varied as it was applied to the gasket, or if the frame that defines the window opening is complex in shape or deep. Smearing of the bead is obviously undersirable, and can require a separate cleanup operation during vehicle assembly.

SUMMARY OF THE INVENTION

The subject invention provides a method of window assembly installation that uses urethane adhesive, but which applies the adhesive after the window is in place, and thereby avoids the drawbacks noted above.

The window assembly to be installed includes a window glass with a peripheral gasket of resilient material that may be integrally molded, or otherwise applied, to the edge of the window glass. The vehicle to which the window assembly is to be attached has a body with a window opening defined by a frame provided by a pinch formed from the metal panels of the vehicle body. The window assembly is sized so as to fit within the window opening with the peripheral gasket engaging the frame and serving as a resilient sealing member. When the window assembly is initially placed within the window opening, the gasket loosely engages the frame. The gasket is also configured such that it cooperatively creates a cavity in conjunction with the loosely engaged frame. The initially loose engagement of the gasket with the frame creates a partial, but not a complete, seal.

The window gasket is also formed with a pair of closely spaced passages that open into the cavity, and which communicate from the cavity to the ambient. A dam or divider located on the gasket between the passages sealingly engages the frame when the window assembly is placed into the window opening, and thereby keeps the passages separate from one another. After the window assembly has been placed into the window opening, a negative pressure is applied to one of the passages, thereby partially evacuating and resiliently compressing the gasket against the window frame to tighten the seal. Simultaneously, flowable urethane adhesive is supplied under pressure to the cavity through the other passage. The adhesive flows around the cavity, assisted by the negative pressure being applied though the other passage. The dam prevents interference between the passages. The tighter seal provided by the partial evacuation keeps the urethane within the cavity as it flows around. Finally, the urethane flows all the way around the cavity to the passage where the negative pressure is being applied, at which point the flow is stopped, and the adhesive is left to cure as usual.

It is, therefore, a broad object of the invention to adhesively attach a window assembly within a window opening defined by a frame by applying the adhesive after the window assembly has been placed in the window opening, thereby avoiding smearing the adhesive onto the frame.

It is another object of the invention to so attach a window assembly by providing the window assembly with a resilient sealing member that is initially loosely engagable against the frame when the window assembly is placed within the window opening and that cooperatively creates a cavity with the frame that is initially partially sealed, and then partially evacuating the cavity to resiliently compress the sealing member and more tightly seal the cavity while supplying adhesive in flowable form under pressure to the cavity, with the partially evacuation both maintaining the cavity seal to keep adhesive from flowing out of the cavity and also assisting the flow of adhesive.

It is yet another object of the invention to provide a window assembly structure well suited to such a method of adhesive attachment, a structure in which the resilient sealing member is a peripheral gasket configured so as to create such a cavity in cooperation with the window frame that is initially partially sealed, and in which the gasket has a pair of closely spaced passages opening into the cavity and separated by a dam that sealingly engages the frame to keep the passages separated so that the negative pressure and the adhesive may be supplied to the cavity through the passages.

DESCRIPTION OF THE PREFERRED EMBODIMENT

These and other objects and features of the invention will appear from the following written description and the drawings in which.

Figure 1:
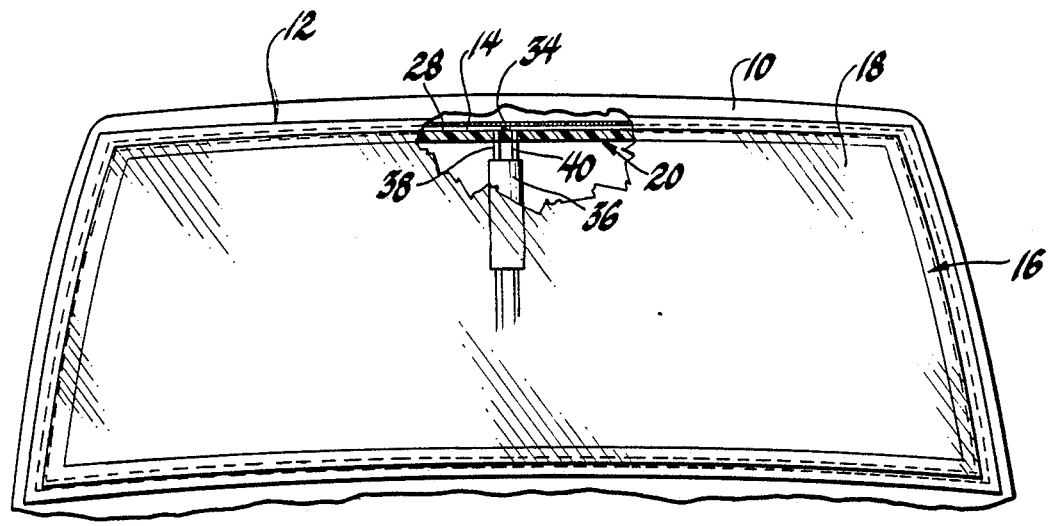
FIG. 1 is a front view of a vehicle with a window assembly being installed by the method of the invention within a window opening with part of the window assembly broken away to reveal details.
Figure 2:
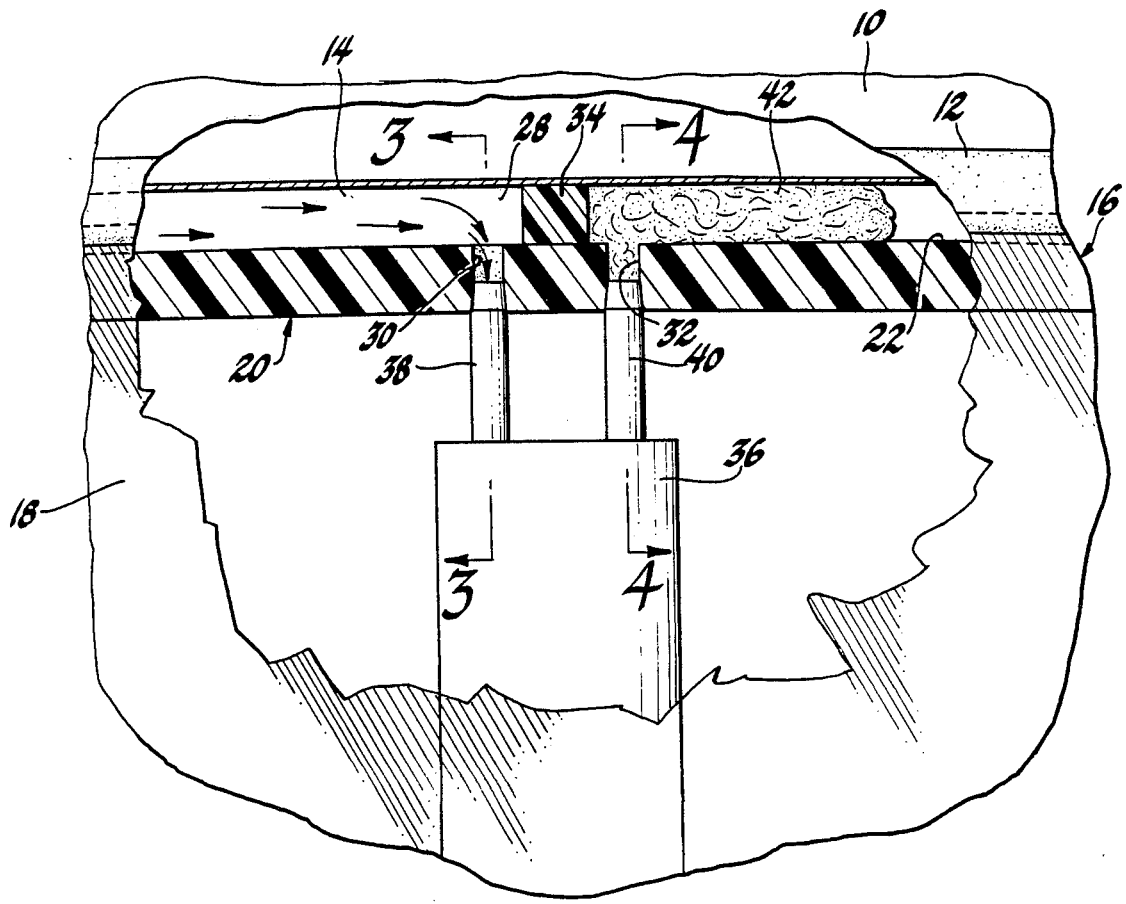
FIG. 2 is an enlargement of a portion of FIG. 1.
Figure 3:
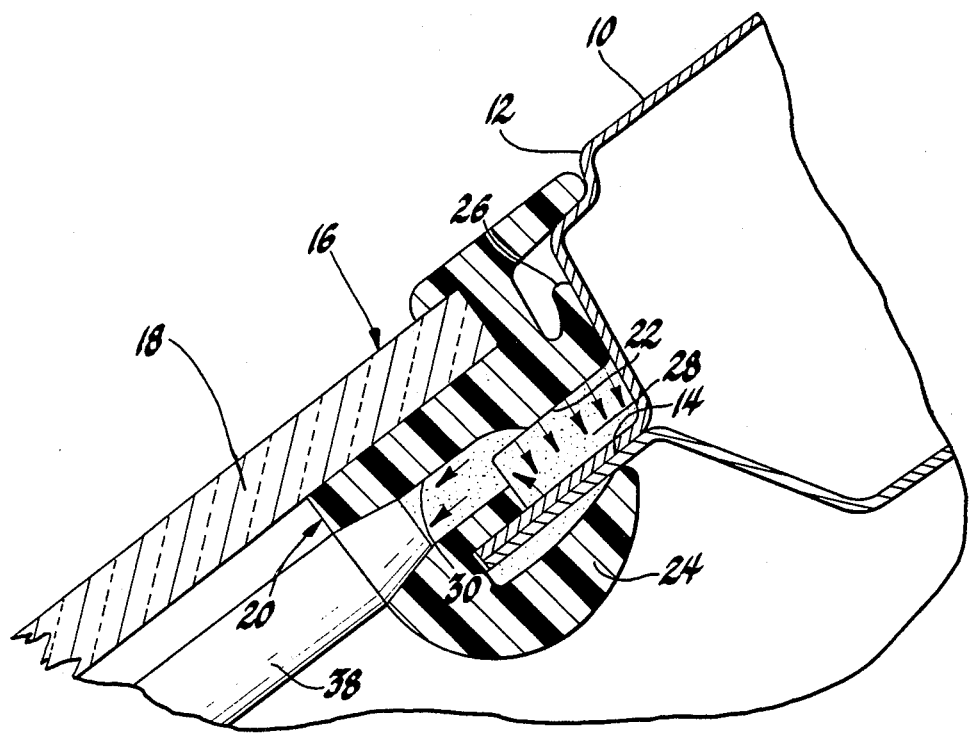
FIG. 3 is a cross section taken along the line 3—3 of FIG. 2.

Referring first to FIGS. 1 and 3, a vehicle body designated generally at 10 is conventionally formed of sheet metal or other suitable panels. Vehicle body 10 includes a window opening 12 that is defined by a pinch weld frame 14 of generally L-shaped cross section, a frame which is formed from the panels of which the vehicle body 10 is manufactured. It will be understood that the frame 14 could be otherwise configured, but it will often be the case that the frame 14, especially with streamlined body styles, will have a complex shape and curvature, as well as a significant depth. This creates a greater number of surfaces within and near the window opening 12 that would be subject to having adhesive smeared thereon if a conventional attachment method were used. A window assembly designated generally at 16 is designed so as to be attachable by the method of the invention, and includes a window glass 18 and a peripheral gasket designated generally at 20. Window assembly 18 is of the type in which the gasket 20 is directly molded to the edge of the window glass 18, and is molded of a suitable elastomer material that has some amount of inherent resilience, such as PVC. In the embodiment disclosed, the gasket 20 is configured with a continuous channel 22 in its under surface which, as best seen in FIG. 2, runs all the way around the gasket 20. Gasket 20 is also molded with a continuous flexible retaining lip 24 which may be pulled over the pinch weld frame 14 by what is known as a "cording in" method. While the retaining lip 24 is not absolutely necessary, it forms a convenient way of holding the window assembly 16 when it has been placed within the window opening 12, as it already has been in FIG. 1. The window gasket 20 is also molded with a resilient sealing lip 26 that continuously borders the channel 22.

Referring next to FIGS. 2 and 3, when the window assembly 16 is initially installed within the window opening 12, whether by the cording method shown or otherwise, both the under surface of the gasket 20 and the sealing lip 24 loosely engage separate legs of the the pinch weld frame 14, thereby forming a continuous cavity 28 in cooperation therewith. The cavity 28 is partially sealed, by virtue of the loose engagement of the gasket 20 with the pinch weld frame 14. However, it will be understood that the cavity 28 is not so tightly sealed as it would be if the window assembly 16 were forced into the the window opening 12 to compress the under surface of the gasket 20 and the resilient sealing lip 24 against the pinch weld frame 14. Such a force might be applied conventionally by physically pushing in on the window glass 18, or by with a separate mechanical fastener run through the frame 14 and into the gasket to snug up the gasket against the frame. However, the invention provides a simpler and more convenient method of tightening the seal. The gasket 20 is also provided with a pair of cylindrical passages 30 and 32 that open to the cavity 28, communicating with the ambient. In the embodiment disclosed, the passages 30 and 32 are closely spaced, and a dam or divider 34 associated with the gasket 20 is located between them, sealingly engaging the pinch weld frame 14. The sealing dam 34 is also formed of a resilient elastomer, and may be either integral with gasket 20, or may be a separate block. The dam 34 may be thought of as dividing the cavity 20 into two separate portions, or may be thought of as giving the continuous cavity 28 two ends, one located on either side of the dam 34. However it is conceptualized, it will be understood that the sealing dam 34 keeps the passages 30 and 32 separate from one another, so that they will not interfere with each other.

Figure 4:
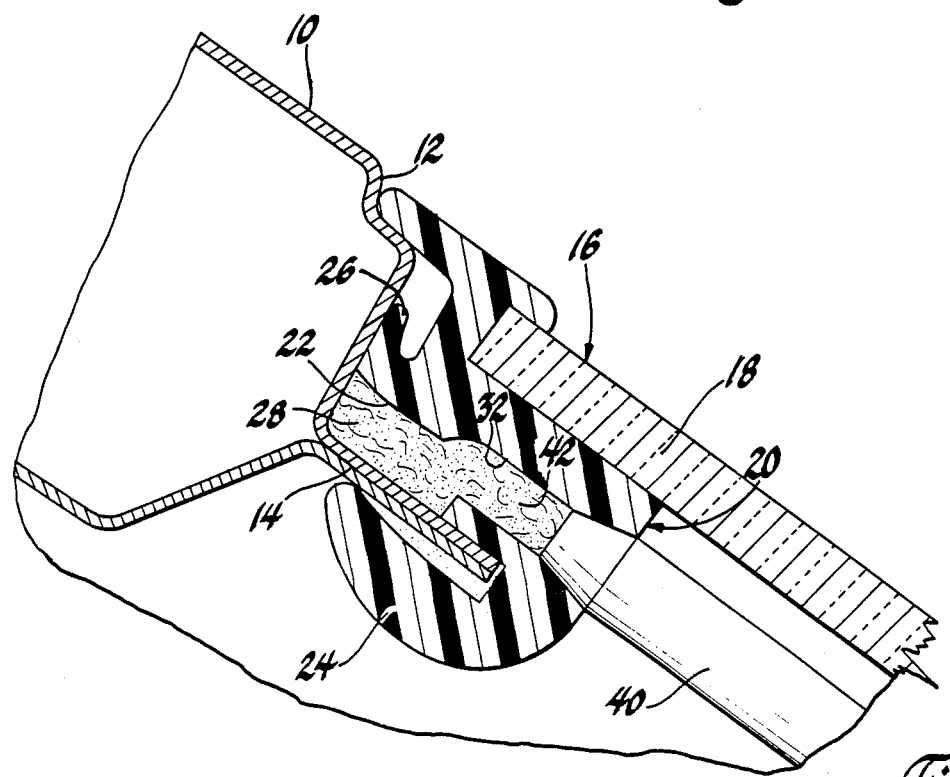
FIG. 4 is a cross-sectional view taken along the line 4—4 of FIG. 2.

Referring next to FIGS. 2, 3 and 4, an apparatus designated generally at 36 includes a pair of nozzles 38 and 40 which are sized so as to fit tightly within respective passages 30 and 32, as seen in FIG. 2. The nozzle 38 would be attached to a suitable vacuum pump, not illustrated. The nozzle 40 would be attached to a suitable pump to supply flowable urethane adhesive. Once the nozzles 38 and 40 are plugged in, the cavity is partially evacuated through the nozzle 38 and passage 30. This is represented in FIG. 2 by the arrows showing a flow of air into the nozzle 36. It will be understood that this creates a downward pull on the window assembly 16, or, more properly, a net inward push on the window glass 18, which is represented by the downward pointing arrows in FIG. 3. Consequently, the under surface of the gasket 20 and the sealing lip 26 are both resiliently compressed against the frame 14, thereby more tightly sealing the cavity 28. Simultaneously with, or very soon after, the application of the vacuum, flowable urethane adhesive, designated at 42, is supplied under positive pressure to the cavity 28 through the nozzle 40 and the passage 32. The positive pressure serves to force the urethane 42 into the cavity, and it begins to flow around the cavity 28 counterclockwise. The flow of urethane 42 is assisted by the evacuating done through the nozzle 38. The tight seal maintained by the partial evacuation, in turn, prevents the urethane 42 from moving outside of the cavity 28 as it flows. When the urethane 42 has flowed entirely around to the passage 38, it has completely filled the cavity 28. The apparatus 36 is then removed. The urethane 42 is allowed to cure as usual, and the installation of the window assembly 16 is complete. It may be easily understood that the method of the invention avoids the problems of smear that occur with a conventional adhesive installation, because the urethane 42 is not applied until the window assembly 16 is already in place. In addition, no separate mechanical fasteners or external holding force need be applied to the window assembly 16 to keep it in place and to keep the seal tight.

While it will be desirable to follow the basic steps of the method of the invention as described and in the order described, variations of the window assembly 16 and apparatus 36 are possible within the broad confines of the method described. For example, the gasket 20 and the pinch weld frame 14 may be varied, so long as the sealable cavity 28 is cooperatively formed. The cavity 28 need not run around the entire periphery of the gasket 20 and frame 14. For example, in certain window assembly designs, cavity 28 could cover just one or two sides of the window opening, or just locations where complex contours presented likely smear surfaces. By the same token, while the passages 30 and 32 are convenient means of communicating with the cavity 28, that communication could conceivably be had by piercing the gasket 20 with a sharp hypodermic type needle. The sealing dam 34 is a convenient way of separating the closely spaced passages 30 and 32, and in turn allows the compact apparatus 36 to be used. However, if the negative pressure and the adhesive were supplied to the cavity at widely separated points, or to opposite ends of an elongated cavity, a sealing dam 34 would not be necessary. Likewise the apparatus 36 with its two closely spaced nozzles 38 and 40 is a convenient means of quickly and simultaneously applying the negative pressure and supplying flow of adhesive. However, separate nozzles on separate apparatuses could also be used. Therefore, it will be understood that the invention is capable of embodiments other than that disclosed, and is not intended to be so limited.

The embodiments of the invention in which an exclusive property or privilege is claimed are defined as follows:

1. A method of adhesively attaching a window assembly within a window opening defined by a frame, comprising the steps of;

providing said window assembly with a resilient sealing member that is loosely engageable against said frame when said window is placed within said window opening, said frame and loosely engaged sealing member thereby cooperatively creating a cavity that is partially sealed, placing said window assembly within said window opening so that said resilient sealing member loosely engages said frame to create said partially sealed cavity, partially evacuating said cavity so as to resiliently compress said sealing member against said window frame and thereby tightly seal said cavity, and, supplying said adhesive in flowable form under pressure to said cavity, said partial evacuation acting both to maintain said cavity tightly sealed so that said adhesive does not flow out of said cavity and to assist the flow of said adhesive into said cavity to fill said cavity and attach said window assembly to said frame.

2. A method of adhesively attaching a window assembly within a window opening defined by a frame, comprising the steps of;

providing said window assembly with a resilient sealing member that is loosely engageable against said frame when said window is placed within said window opening and which is configured so as to cooperatively create a continuous cavity with said frame that is partially sealed, providing said resilient sealing member with a pair of closely spaced passages communicating between said cavity and the ambient and separated by a dam that is sealingly engageable with said frame when said window is placed within said window opening, placing said window assembly within said window opening so that said sealing member loosely engages said frame to create said partially sealed cavity, partially evacuating said cavity through one of said passages so as to resiliently compress said sealing member against said window frame and thereby tightly seal said cavity, and, supplying said adhesive in flowable form under pressure to said cavity through the other of said passages, said partial evacuation acting both to maintain said cavity tightly sealed so that said adhesive does not flow out of said cavity and to assist the flow of said adhesive into said cavity to fill said cavity and attach said window assembly to said frame.

* * * * *